(12) United States Patent
Barr, Jr. et al.

(10) Patent No.: US 8,089,825 B2
(45) Date of Patent: Jan. 3, 2012

(54) METHOD OF SUMMING DUAL-SENSOR TOWED STREAMER SIGNALS USING CROSS-GHOSTING ANALYSIS

(75) Inventors: Frederick James Barr, Jr., Pearland, TX (US); Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 692 days.

(21) Appl. No.: 12/231,117

(22) Filed: Aug. 29, 2008

(65) Prior Publication Data

US 2010/0054081 A1    Mar. 4, 2010

(51) Int. Cl.
*G01V 1/38* (2006.01)
(52) U.S. Cl. .............................. 367/24; 367/38
(58) Field of Classification Search .............. 367/21–24, 367/38
See application file for complete search history.

(56) References Cited

U.S. PATENT DOCUMENTS

| | | | | |
|---|---|---|---|---|
| 4,979,150 A | * | 12/1990 | Barr | ................................. 367/24 |
| 5,757,720 A | | 5/1998 | Soubaras | |
| 5,774,717 A | * | 6/1998 | Porcaro | ................................. 1/1 |
| 6,738,715 B2 | * | 5/2004 | Shatilo et al. | ................... 702/17 |
| 7,359,283 B2 | | 4/2008 | Vaage et al. | |
| 2005/0195686 A1 | * | 9/2005 | Vaage et al. | ..................... 367/21 |

FOREIGN PATENT DOCUMENTS

GB    2442854    4/2008
WO    WO 2009/136156    11/2009

OTHER PUBLICATIONS

Lasse Amundsen, "Wavenumber-based filtering of marine point-source data", Geophysics, vol. 58, No. 9, Sep. 1993, p. 1335-1348.
United Kingdom Patent Office Search Report, Dec. 10, 2009.

* cited by examiner

Primary Examiner — Jack Keith
Assistant Examiner — Krystine Breier

(57) ABSTRACT

A merged particle velocity signal is generated by combining a recorded vertical particle velocity signal, scaled in an upper frequency range using a time-dependent arrival angle as determined by cross-ghosting analysis, with a simulated particle velocity signal, calculated in a lower frequency range from a recorded pressure signal using a time-varying filter based on the time-dependent arrival angle. Combined pressure and vertical particle velocity signals are generated from the recorded pressure and merged particle velocity signals.

21 Claims, 8 Drawing Sheets

---

11 — Generate merged particle velocity signal by merging recorded vertical particle velocity signal, scaled in upper frequency range using time-dependent arrival angle as determined by cross-ghosting analysis, with simulated particle velocity signal, calculated in lower frequency range from recorded pressure signal using time-varying filter based on time-dependent arrival angle 12 — Generate combined pressure and vertical particle velocity signals by combining recorded pressure and merged particle velocity signals

METHOD OF SUMMING DUAL-SENSOR TOWED STREAMER SIGNALS USING CROSS-GHOSTING ANALYSIS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of noise attenuation in dual-sensor marine seismic streamer data.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source. In an air gun array, each air gun typically stores and quickly releases a different volume of highly compressed air, forming a short-duration impulse.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers is towed behind a seismic vessel.

When the air-gun array is fired, an impulse sound wave travels down through the water and into the earth. At each interface where the type of rock changes, a portion of that sound wave is reflected back toward the surface and back into the water layer. After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure waves. The pressure waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

Maximum attenuation of the pressure wave occurs at frequencies for which the propagation distance between the detecting hydrophone and the water surface is equal to one-half wavelength. Maximum amplification occurs at frequencies for which the propagation distance between the detecting hydrophone and the water surface is one-quarter wavelength. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation occurs at a frequency of about 107 Hz and maximum amplification occurs at a frequency of about 54 Hz.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to -produce the two wavefields at the same location.

It is well known in the art that pressure and particle motion signals can be combined to derive both the up-going and the down-going wavefield: For sea floor recordings, the up-going and down-going wavefields may subsequently be combined to remove the effect of the surface reflection and to attenuate water borne multiples in the seismic signal. For towed streamer applications, however, the particle motion signal has been regarded as having limited utility because of the high noise level in the particle motion signal. However, if particle motion signals could be provided for towed streamer acquisition, the effect of the surface reflection "ghosts" could be removed from the data.

It has been difficult to achieve the same bandwidth in the motion sensor data as in the pressure sensor data, however, because of the noise induced by vibrations in the streamer, which is sensed by the particle motion sensors. The noise is, however, mainly confined to lower frequencies. One way to reduce the noise is to have several sensors, closely spaced apart from one another, and wired in series or in parallel. This approach, however, does not always reduce the noise enough to yield a signal-to-noise ratio satisfactory for, further seismic processing.

Conventional 3D marine seismic acquisition by towed streamer usually results in asymmetrical spatial sampling and fold between inline and cross-line directions. The sampling density is denser in the inline direction (parallel to the towed streamers) than in the cross-line direction (perpendicular to the towed streamers). The asymmetry is due to a wider spacing between receivers in separate streamers than between receivers in the same streamer. This asymmetry can lead to spatial aliasing of the sampling data in the cross-line direction. The aliasing interferes with efforts to combine the pressure and particle motion signals to derive the up-going and down-going wavefields.

Thus, a need exists for a method for attenuating low frequency noise found in vertical particle velocity sensor signals, when combining pressure sensor and vertical particle velocity sensor signals in dual-sensor seismic streamer data, which accounts for non-vertical angles of incidence, also known as arrival angles.

BRIEF SUMMARY OF THE INVENTION

The invention is a method for combining pressure signals and vertical particle velocity signals in dual-sensor towed streamers. A merged particle velocity signal is generated by combining a recorded vertical particle velocity signal, scaled in an upper frequency range using a time-dependent arrival angle as determined by cross-ghosting analysis, with a simulated particle velocity signal, calculated in a lower frequency range from a recorded pressure signal using a time-varying filter based on the time-dependent arrival angle. Combined pressure and vertical particle velocity signals are generated by combining the recorded pressure signal and the merged particle velocity signals.

BRIEF DESCRIPTION OF THE DRAWINGS

The invention and its advantages may be more easily understood by reference to the following detailed description and the attached drawings, in which.

Figure 1:
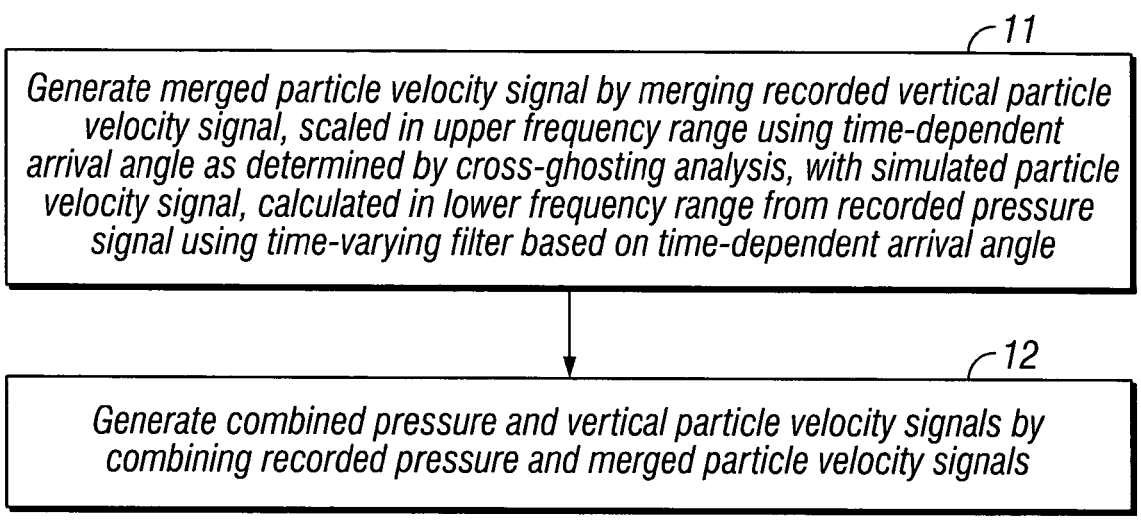
FIG. 1 is a flowchart illustrating an embodiment of the invention for combining pressure and vertical particle velocity signals in dual-sensor towed streamers.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

A dual-sensor seismic streamer records the seismic wavefield using both pressure and vertical particle velocity sensors, allowing a subsequent decomposition of the total wavefield into upgoing and downgoing components. The error in the estimate of these components is increased by noise on either sensor, but the noise is typically greater in the vertical particle velocity sensor. Undesirable low-frequency noise on the vertical particle velocity sensor can be removed before decomposition by replacing the lower frequency portion of the vertical particle velocity data with a predicted vertical particle velocity signal calculated from the pressure signal. This prediction takes into account factors which include the properties of the propagation medium, the incidence angle of the incoming energy and the "ghost" which arises from reflection of the seismic wavefield at the sea surface. This replacement process reduces the contribution from the noisier vertical particle velocity sensor.

This low frequency replacement process is described more fully in U.S. Pat. No. 7,359,283 B2, of Svein Vaage, et al.; entitled "System for Combining Signals of Pressure Sensors and Particle Motion Sensors in Marine Seismic Streamers"; issued Apr. 15, 2008; and assigned to an affiliated company of the assignee of the present invention. Vaage et al. describe a method for combining signals of a pressure sensor and a particle motion sensor recorded in a marine seismic streamer to reduce noise in the combined pressure sensor signal and particle motion sensor signal, the recorded pressure sensor signal having a bandwidth comprising a first frequency range and a second frequency range, the first frequency range being at lower frequencies than the frequencies of the second frequency range, and the recorded particle motion sensor signal having a bandwidth comprising at least the second frequency range. The method comprises calculating a particle motion sensor signal in the first frequency range from the recorded pressure sensor signal, thereby generating a simulated particle motion sensor signal in the first frequency range; merging the simulated particle motion sensor signal only in the first frequency range with the recorded particle motion sensor signal in the second frequency range to generate a merged particle motion sensor signal having substantially the same bandwidth as the bandwidth of the recorded pressure sensor signal, and combining the recorded pressure sensor signal and the merged particle motion sensor signal for further processing.

The invention overcomes spatial aliasing problems by providing a method that performs all operations on each corresponding pair of pressure and vertical particle velocity traces recorded at each streamer receiver station. Thus, the method of the invention does not require modifying the acquisition recording geometry to avoid spatial aliasing.

The invention employs the combined signals of pressure sensors (typically hydrophones) and vertical particle velocity sensors (typically geophones) located in seismic streamers. The combined signals can then be utilized to generate the up- and down-going wavefield components, which are useful for further seismic processing, such as attenuation of multiples in marine seismic data. Since a recorded vertical particle velocity signal is often contaminated by low frequency noise due to the vibrations in a towed streamer, the signal-to-noise ratio for the combined signals would be poor. The vertical particle velocity signal may be calculated from the pressure sensor signal within a given frequency range if the spectrum of the pressure sensor signal has a satisfactory signal-to-noise ratio within this frequency range (and has no notches within this frequency range) and if the depth of the pressure and vertical particle velocity sensors is known. If the depth to the sensors is unknown, the depth can be calculated from the frequency of the spectral notches introduced by the surface reflection, a process which is well known in the art.

The low frequency part of the vertical particle velocity signal will typically need to be replaced because it has a low signal-to-noise ratio. The corresponding portion of the pressure sensor signal to be used for calculating the particle motion signal will typically have a good signal-to-noise ratio in this low frequency range. Therefore, the depth of the pressure sensor is preferably chosen so that the frequency of the first spectral notch in the pressure sensor signal caused by the surface reflection is higher than the low frequency range in which the vertical particle velocity signal is calculated and substituted.

The method of the invention is to compute the non-vertical arrival angles $\phi(t)$, at each dual-sensor receiver station, as a function of recording time t, from the ghost reflection time delays of the reflection events, which depend upon the apparent horizontal velocities of the reflection events in the source-to-receiver offset-time (x,t) domain, as determined from cross-ghosting analyses. If the recorded vertical particle velocity signal g(t) is not corrupted by tow noise, then each time sample of that recorded vertical particle velocity signal g(t) is simply scaled by the factor $$\frac{1}{\cos[\phi(t)]}$$

prior to combining it with its corresponding recorded pressure signal h(t). If, however, the recorded vertical particle velocity signal g(t) is corrupted by tow noise, then the invention provides an efficient method for handling the low frequency replacement computation of the vertical particle velocity signal.

Figure 2:
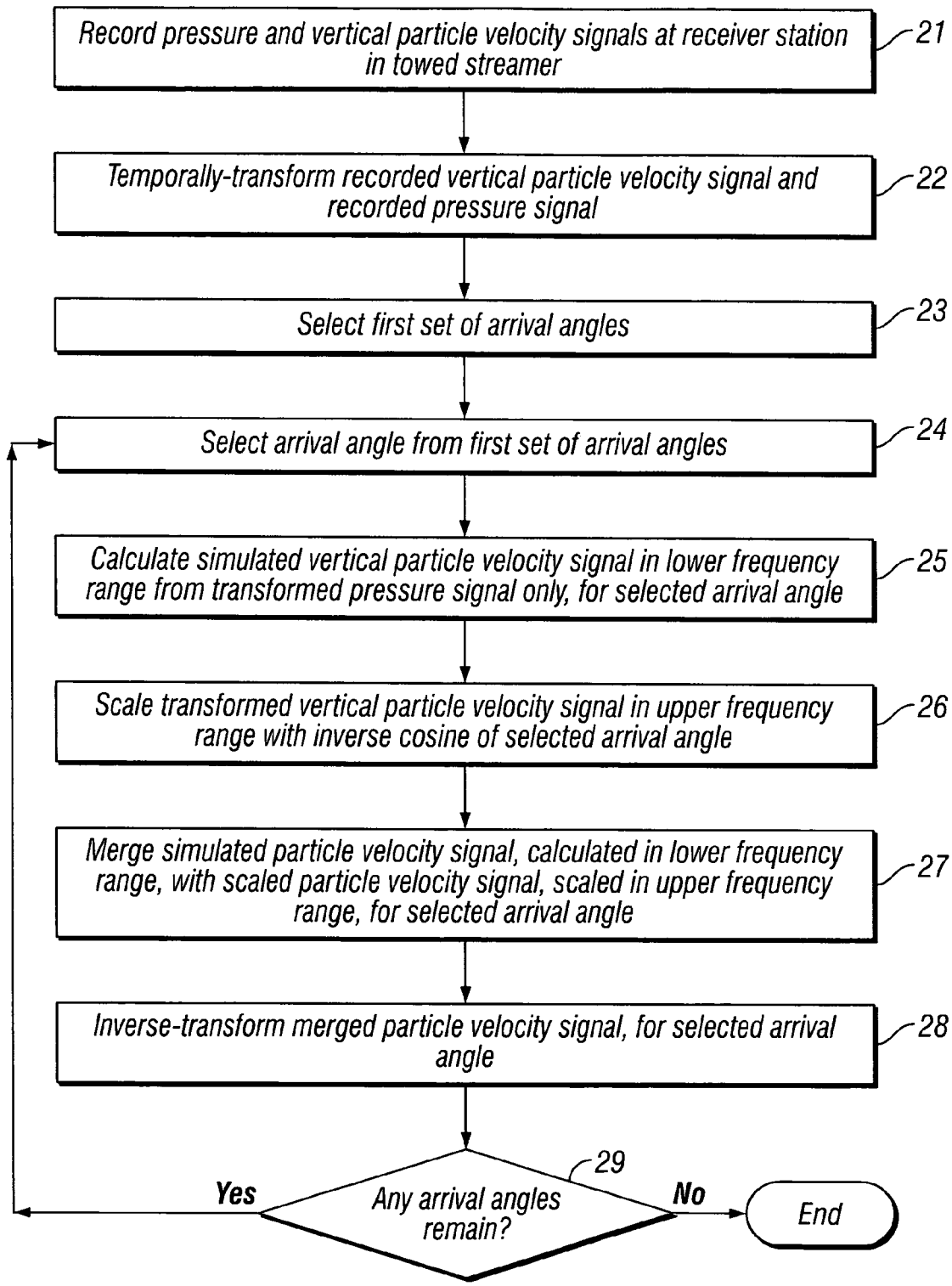
FIG. 2 is a flowchart illustrating an embodiment of the invention for generating a merged particle velocity signal.
Figure 3:
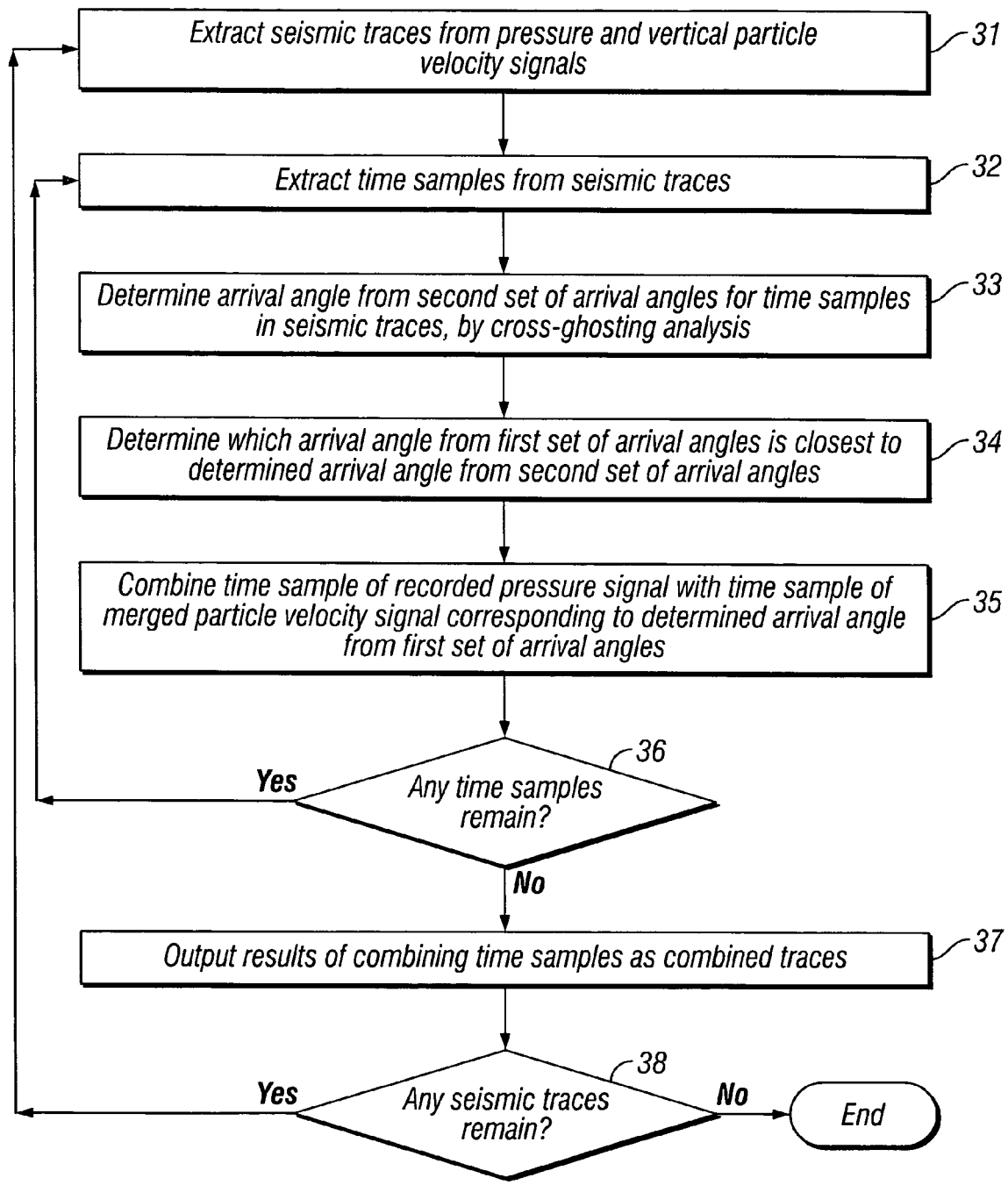
FIG. 3 is a flowchart illustrating an embodiment of the invention for combining a recorded pressure signal with the merged particle velocity signal from FIG. 2.
Figure 4:
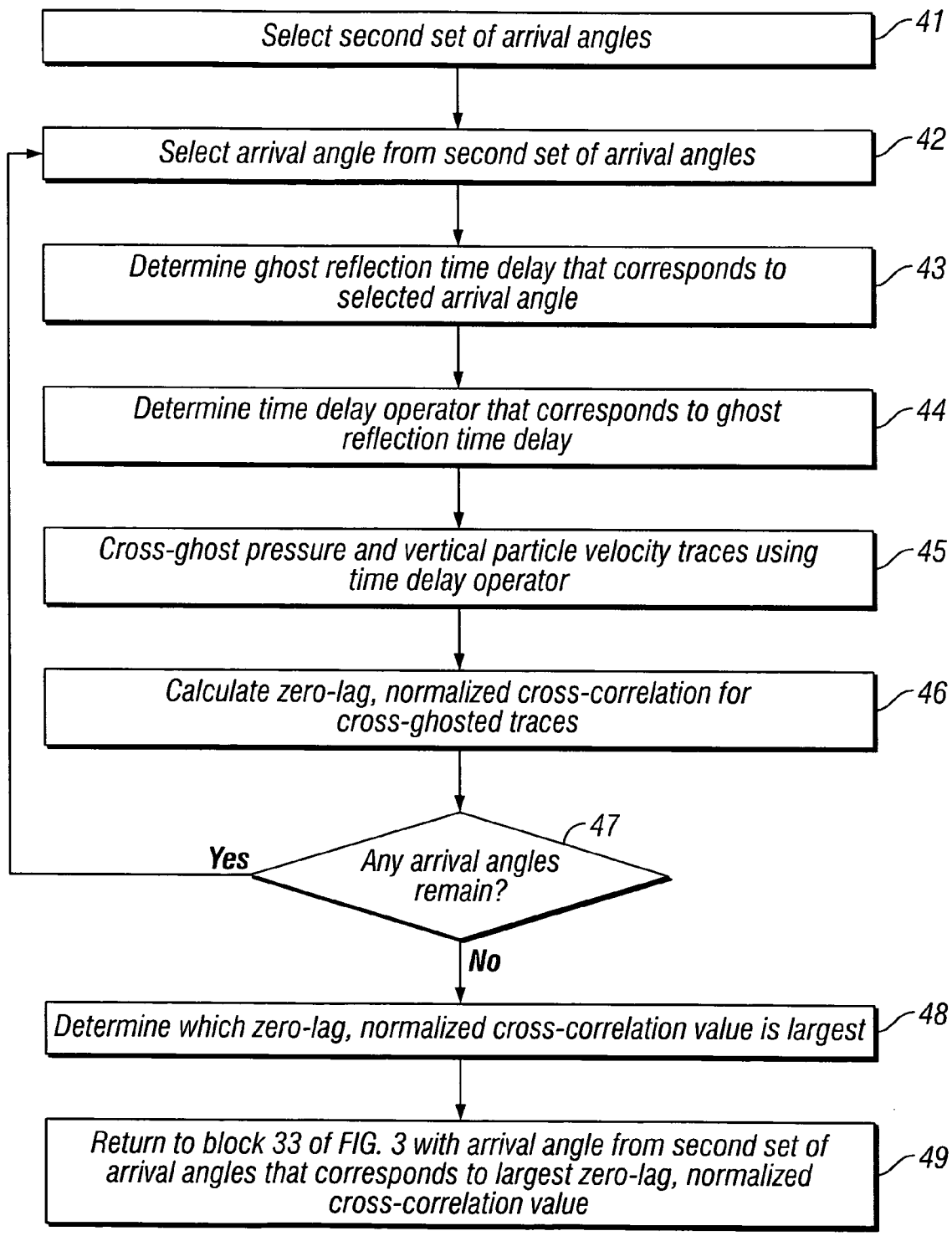
FIG. 4 is a flowchart illustrating an embodiment of the invention for determining arrival angles from cross-ghosting analysis in FIG. 3.
Figure 5:
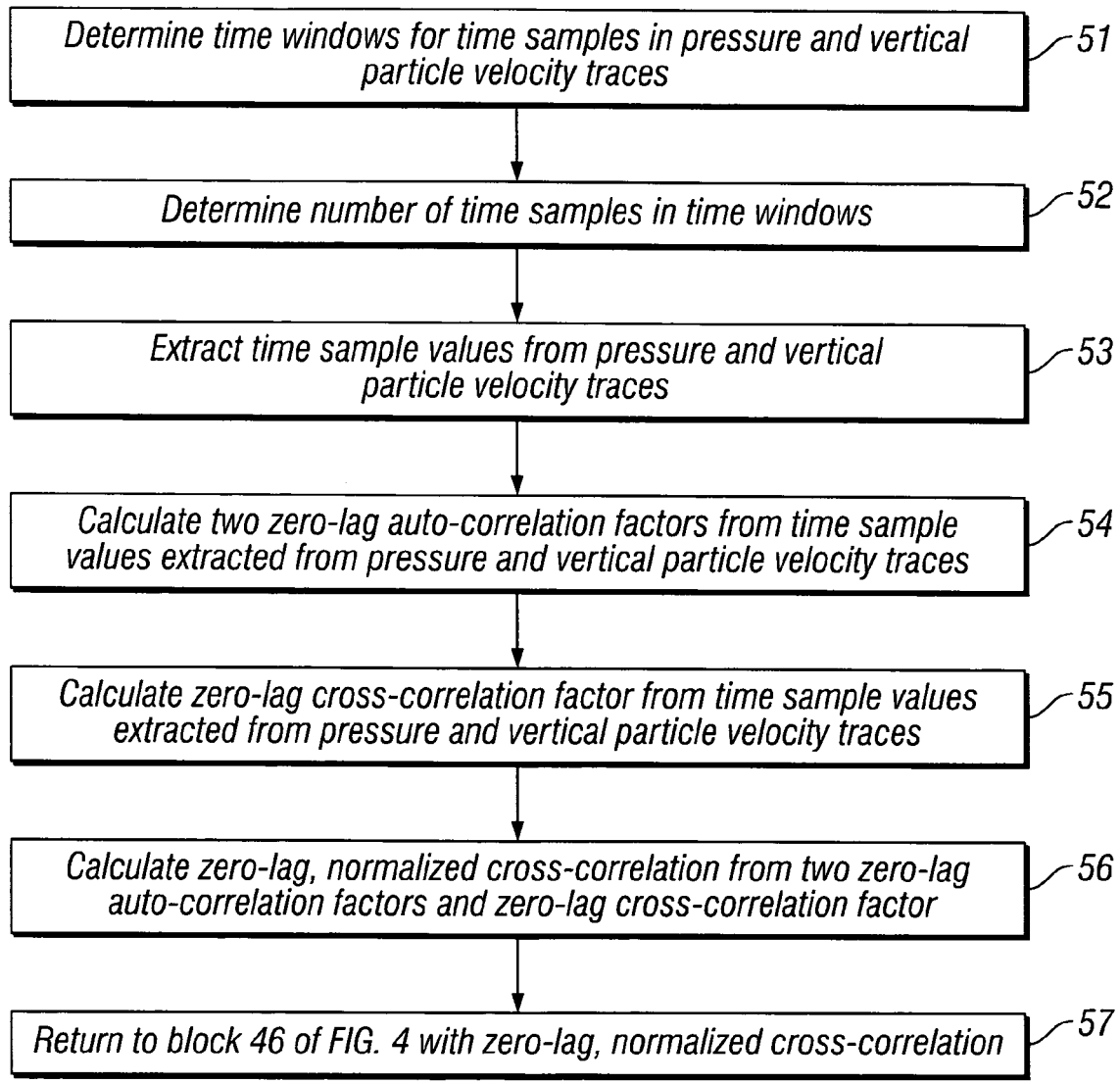
FIG. 5 is a flowchart illustrating an embodiment of the invention for determining a zero-lag, normalized cross-correlation of cross-ghosted traces in FIG. 4.

FIGS. 1-5 show flowcharts illustrating embodiments of the invention for attenuating low frequency noise in dual-sensor seismic streamer data. FIG. 1 is a flowchart illustrating a general description of the invention. FIGS. 2-3 are flowcharts further illustrating particular portions of the invention as described in FIG. 1. FIG. 4 is a flowchart illustrating cross-ghosting analysis for determining arrival angles in FIG. 3. FIG. 5 is a flowchart illustrating the zero-lag, normalized cross-correlation employed in the cross-ghosting analysis in FIG. 4.

FIG. 1 is a flowchart illustrating an embodiment of the invention for combining pressure signals and vertical particle velocity signals in dual-sensor towed streamers.

At block 11, a merged particle velocity signal is generated by merging a recorded vertical particle velocity signal, scaled in an upper frequency range using a time-dependent arrival angle as determined by cross-ghosting analysis, with a simulated particle velocity signal, calculated in a lower frequency range from a recorded pressure signal using a time-varying filter based on the time-dependent arrival angle.

At block 12, combined pressure and vertical particle velocity signals are generated by combining the recorded pressure signal and the merged particle velocity signals from block 11.

FIG. 2 is a flowchart illustrating an embodiment of the invention for generating a merged particle velocity signal. FIG. 2 illustrates in more detail the portion of the invention discussed in block 11 of FIG. 1, above.

At block 21, pressure signals h(t) and vertical particle velocity signals g(t) are recorded at a receiver station in a dual-sensor towed streamer. It is within the scope of the invention that other types of seismic sensors be employed in the invention. Thus, for generality, the recorded signals will be referred to as pressure signals rather than pressure sensor signals and as particle velocity signals rather than particle velocity sensor signals. The other types of seismic sensors could include, but are not limited to, multi-directional particle velocity sensors, particle displacement sensors, particle acceleration sensors, or pressure gradient sensors being used in place of or in addition to vertical particle velocity sensors. The pressure and vertical particle velocity sensors may be deployed by themselves, but are more commonly deployed in sensor arrays. Additionally, the pressure sensors and particle velocity sensors are typically positioned together in the streamers, collocated in pairs or pairs of arrays.

The method of the invention employs particle motion sensors that are responsive to motions in the particles of the medium to which the motion sensors are coupled, typically water. In general, particle motion sensors may be responsive to the displacement of the particles, the velocity of the particles, or the acceleration of the particles in the medium. Particle velocity sensors are typically employed and so are used to illustrate the present invention. If motion sensors are used which are responsive to position, then the position signal is preferably differentiated to convert it to a velocity signal, by computational means well known in the art. If motion sensors are used which are responsive to acceleration (such as accelerometers), then the acceleration signal is preferably integrated to convert it to a velocity signal, by computational means well known in the art.

At block 22, the recorded pressure signal h(t) and vertical particle velocity signal g(t) from block 21 are temporally-transformed from a time domain to yield H($\omega$) and G($\omega$), respectively, in a frequency domain. In the following discussion, signals in the time domain are denoted by lower case letters, while the same signals in the frequency domain are denoted by the corresponding capital letters. Here, $\omega$ is radial frequency in radians/second, equal to $2\pi f$ for temporal frequency f in Hertz. In an illustrated embodiment of the invention, the calculations (and following operations) are done in the frequency domain. Thus, the transformations can be done by any well-known temporal transform, such as, for example, Fourier transforms. However, this choice of transform is for convenience only and is not meant to be a limitation of the invention.

Additionally, the transformed pressure and particle velocity signals, H($\omega$) and G($\omega$), respectively, are corrected for relative differences in the instrument transfer functions, which correspond to instrument impulse responses in the time domain. These corrections could either be correcting the amplitude and phase of the pressure signals to match the particle velocity signals, or, in an alternative embodiment, correcting the particle velocity signals to match the pressure signals, or, in a further alternative embodiment, correcting both data sets to a common basis. Correcting for relative differences in instrument impulse responses is well known in the art. Finally, an amplitude scaling equal to the acoustic impedance in the water is preferably applied to the particle velocity signals to correct for the relative differences in amplitudes of pressure and particle velocity. This is also well known in the art.

At block 23, a first set of arrival angles $\{\phi_j\}$ is selected. The first set of arrival angles $\{\phi_j\}$ is selected to cover a range of arrival angles, measured from vertical, expected to be encountered for reflection wavelets in the recorded pressure signals h(t) and vertical particle velocity signals g(t) obtained in block 21. The first set of arrival angles $\{\phi_j\}$ may be designated as the set $\{\phi_j, \text{for } j=0, 1, 2, \ldots, J\}$ for some selected total number of arrival angles equal to J+1. In one example embodiment with J=60, a set of 61 arrival angles $\phi_j$ are equal to the set $\{\phi_j\}=\{0°, 1°, 2°, \ldots, 60°\}$, corresponding to j=0, 1, 2, \ldots, 60, respectively.

At block 24, an arrival angle $\phi_j$ is selected from the first set of arrival angles $\{\phi_j\}$ in block 23. Preferably, the arrival angles are selected in a systematic manner, such as proceeding sequentially through the arrival angles $\phi_j$ in the order j=0, 1, 2, \ldots, J.

At block 25, a simulated particle velocity signal $G_j^{calc}(\omega)$ is calculated in a lower frequency range from a transformed pressure signal H($\omega$) from block 22, for the arrival angle $\phi_j$ selected in block 24 from the first set of arrival angles $\{\phi_j\}$. The lower-frequency portion of the particle velocity frequency spectrum $G_j^{calc}(\omega)$ can be calculated from the corresponding pressure frequency spectrum H($\omega$) only, that is, without using the vertical particle velocity signal recorded in the lower frequency range. This calculation can be done, for instance, by using the expression:

$$G_j^{calc}(\omega) = \frac{1+Z_j}{1-Z_j} H(\omega), \tag{1}$$

in the lower frequency range. In Equation (1), $Z_j$ is a time delay operator, which can be expressed by:

$$Z_j = \exp[-i\omega\tau_j] = \cos(\omega\tau_j) - i\sin(\omega\tau_j), \tag{2}$$

where $\tau_j$ is ghost reflection time delay in seconds given by:

$$\tau_j = \cos(\phi_j)\frac{2D}{c}. \tag{3}$$

Here, $i=\sqrt{-1}$ is the imaginary unit, $\phi_j$ is the arrival angle selected in block 24, D is receiver depth in meters and c is speed of sound in the medium in meters/sec. In water, c is typically about 1500 m/s. The depth D may be determined by any means known in the art, such as by a depth sensor or a calculation.

For each value of arrival angle $\phi_j$, Equation (1) is evaluated for values of frequency $\omega$ corresponding to frequency f ranging from about 1 Hz to a value less than that which causes the difference $(1-Z_j)$ to equal zero, i.e., the first non-zero-frequency notch in the frequency spectrum H($\omega$) of the pressure sensor signal.

At block 26, the transformed vertical particle velocity signal G($\omega$) from block 22 is scaled in an upper frequency range. The transformed vertical particle velocity signal G($\omega$) from block 22 is scaled in amplitude to compensate for the directional sensitivity of vertical particle velocity sensors. In particular, the transformed vertical particle velocity signal G($\omega$) is scaled in the upper frequency range by being divided by the cosine of the arrival angle $\phi_j$ selected in block 24 from the first set of arrival angles $\{\phi_j\}$, generating a scaled particle velocity signal $G_j^{scal}(\omega)$. Thus:

$$G_j^{scal}(\omega) = \frac{G(\omega)}{\cos(\phi_j(t))}, \tag{4}$$

in the upper frequency range. In a particular embodiment, the lower frequency range from block 25 and the upper frequency range here in block 26 combine to equal the total bandwidth of the transformed pressure senor signal H($\omega$) from block 22.

At block 27, the simulated particle velocity signal $G_j^{calc}(\omega)$, calculated in the lower frequency range in block 25, is merged with the scaled particle velocity signal $G_j^{scal}(\omega)$, scaled in the upper frequency range in block 26, to generate a merged particle velocity signal $G_j^{merg}(\omega)$ having substantially the same bandwidth as the bandwidth of the recorded pressure signal $H(\omega)$, for the arrival angle $\phi_j$ selected in block 24. In a particular embodiment, this merging is done as described above in U.S. Pat. No. 7,359,283 B2 by Vaage et al., discussed above.

At block 28, the merged particle velocity signal $G_j^{merg}(\omega)$ from block 27 is inverse-transformed from the frequency domain to yield $g_j^{merg}(t)$ back in the time domain. As above, this inverse temporal transformation can be done by any well-known transform, such as, for example, inverse Fourier transforms. However, this choice of transform is for convenience only and is not meant to be a limitation of the invention.

At block 29, it is determined if any arrival angles $\phi_j$ remain from the first set of arrival angles $\{\phi_j\}$ selected in block 23. If any arrival angles $\phi_j$ remain, then the process returns to block 24 to select another arrival angle $\phi_j$. If no arrival angles $\phi_j$ remain, then the process ends.

FIG. 3 is a flowchart illustrating an embodiment of the invention for combining a recorded pressure signal with the merged particle velocity signal from FIG. 2. FIG. 3 illustrates in more detail the portion of the invention discussed in block 12 of FIG. 1, above.

At block 31, a pressure trace and a vertical particle velocity trace are extracted from the pressure signals h(t) and vertical particle velocity signals g(t), respectively, recorded in block 21 of FIG. 2. The seismic traces correspond to seismic data acquired at each sensor location in the dual-sensor seismic streamers.

At block 32, time samples are extracted at a recorded time t in the pressure and vertical particle velocity traces extracted in block 31 from the pressure sensor signal h(t) and vertical particle velocity signal g(t), respectively.

At block 33, an arrival angle $\phi_k$ is determined at the recorded time in the time samples extracted in block 32 from the pressure and vertical particle velocity traces extracted in block 31. In one embodiment of the invention, the calculation of the arrival angle $\phi_k$ is done by way of cross-ghosting analysis. This cross-ghosting analysis is described in further detail in the discussion with regard to the flowchart in FIG. 4.

At block 34, it is determined which arrival angle $\phi_j$ of the first set of arrival angles $\{\phi_j\}$ from block 23 of FIG. 2 is closest to the arrival angle $\phi_k$ from the second set of arrival angles determined in block 33.

At block 35, a time sample of the recorded pressure signal h(t) is combined with a time sample of the corresponding merged particle velocity signal $g_j^{merg}(t)$ from block 28 of FIG. 2, that corresponds to the arrival angle $\phi_j$ from the first set of arrival angles determined in block 34. In a particular embodiment, the combining of time samples refers to the construction of up-going and down-going wavefield components from the appropriate combination of the time samples from pressure signals and particle velocity signals. In particular, the up-going wavefield component may be calculated from the appropriate addition of the pressure signals and particle velocity signals, while the down-going wavefield component may be calculated from the appropriate subtraction of the particle velocity signal from the pressure signal, as is well-known in the art of seismic data processing.

At block 36, it is determined if more time samples from block 32 exist in the seismic traces from block 31. If more time samples exist, then the process returns to block 32 to extract another pair of time samples. If no more time samples exist, then the process continues on to block 37.

At block 37, results of combining the time samples in block 35 are output as combined traces.

At block 38, it is determined if more seismic traces from block 31 exist in the pressure signals and vertical particle velocity signals. If more seismic traces exist, then the process returns to block 31 to extract another pair of seismic traces. If no more seismic traces, then the process ends.

Figure 6:
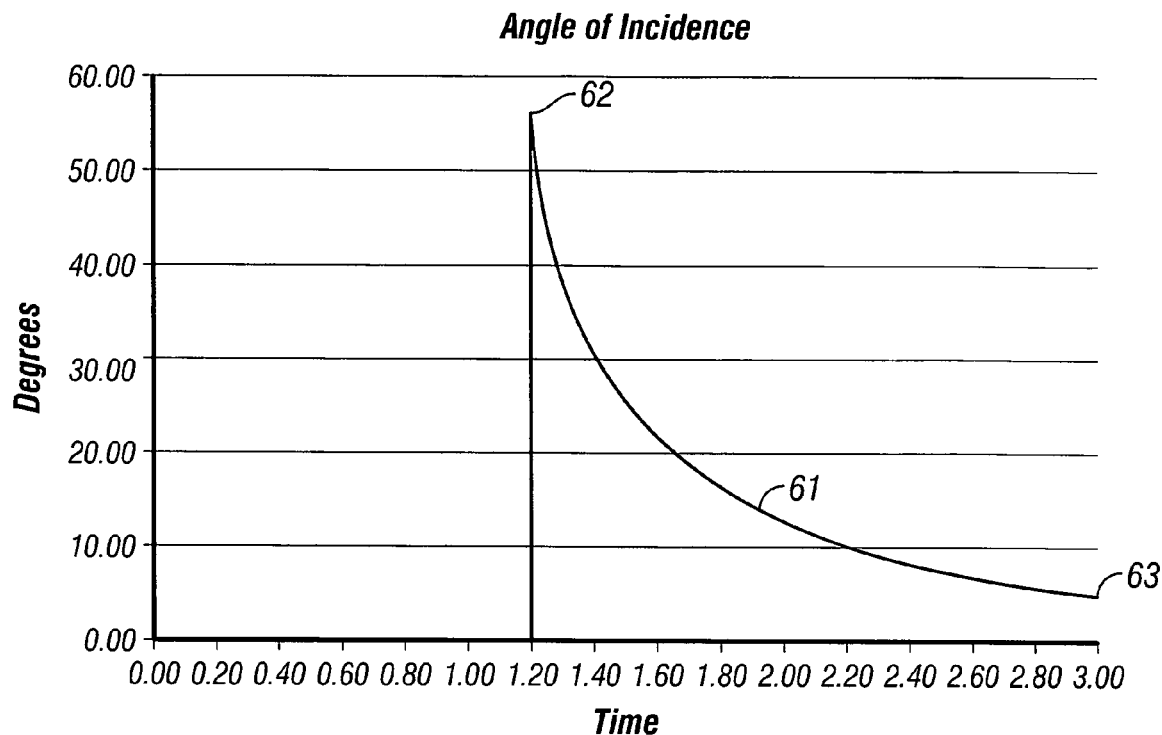
FIG. 6 is a graph of the vertical arrival angle as a function of recording time.
Figure 7:
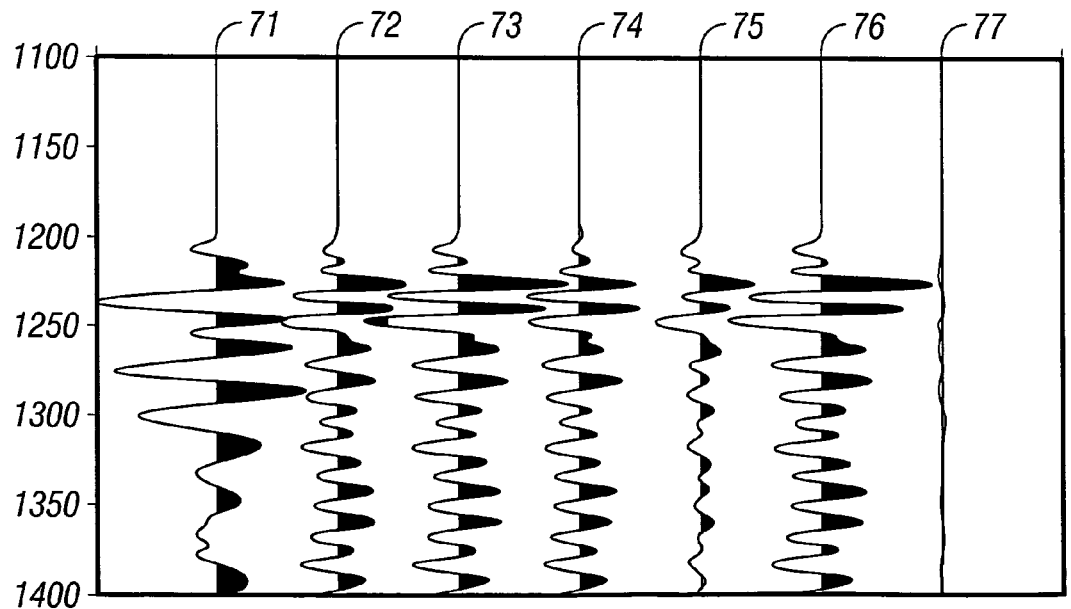
FIG. 7 is a section of pressure and vertical particle velocity synthetic traces.
Figure 8:
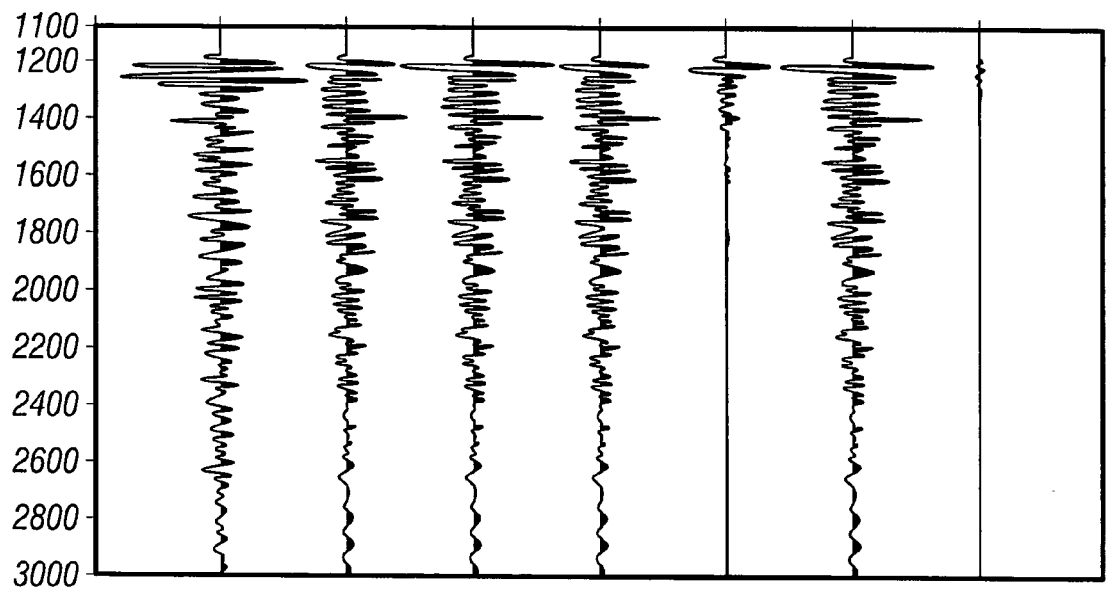
FIG. 8 is a section of the synthetic traces shown in FIG. 7, extended down to 3.0 seconds.
Figure 9:
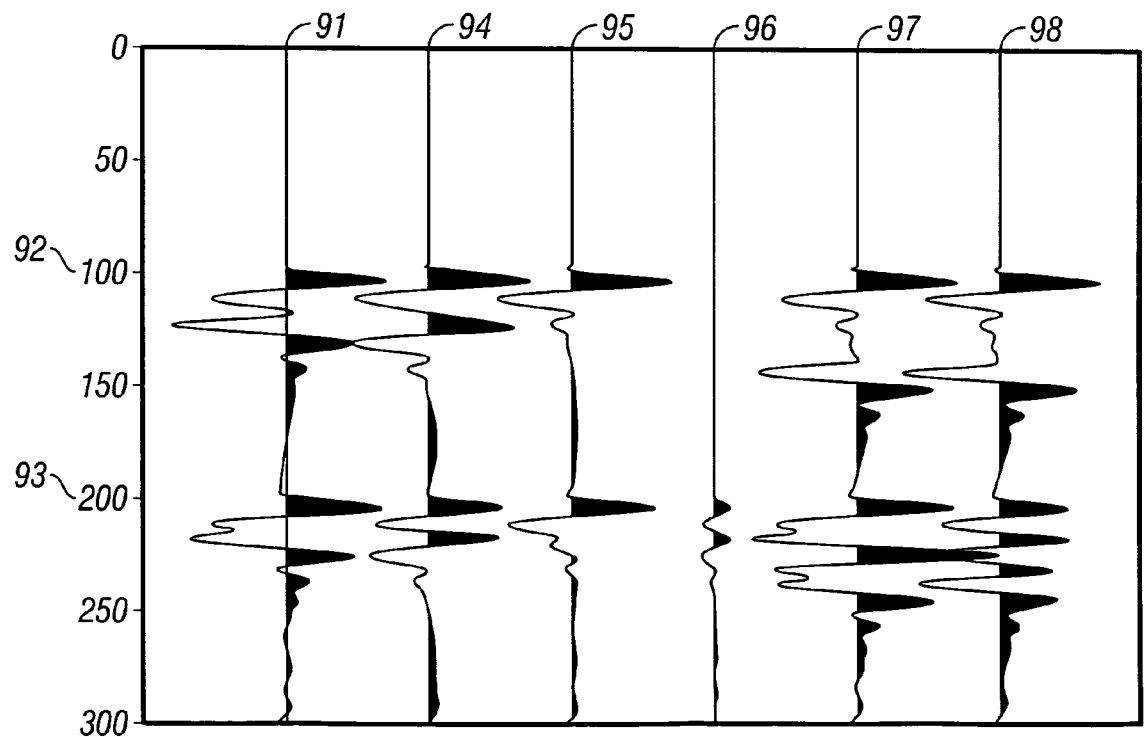
FIG. 9 is a section of pressure and vertical particle velocity synthetic traces with a first cross-ghosting time delay.
Figure 10:
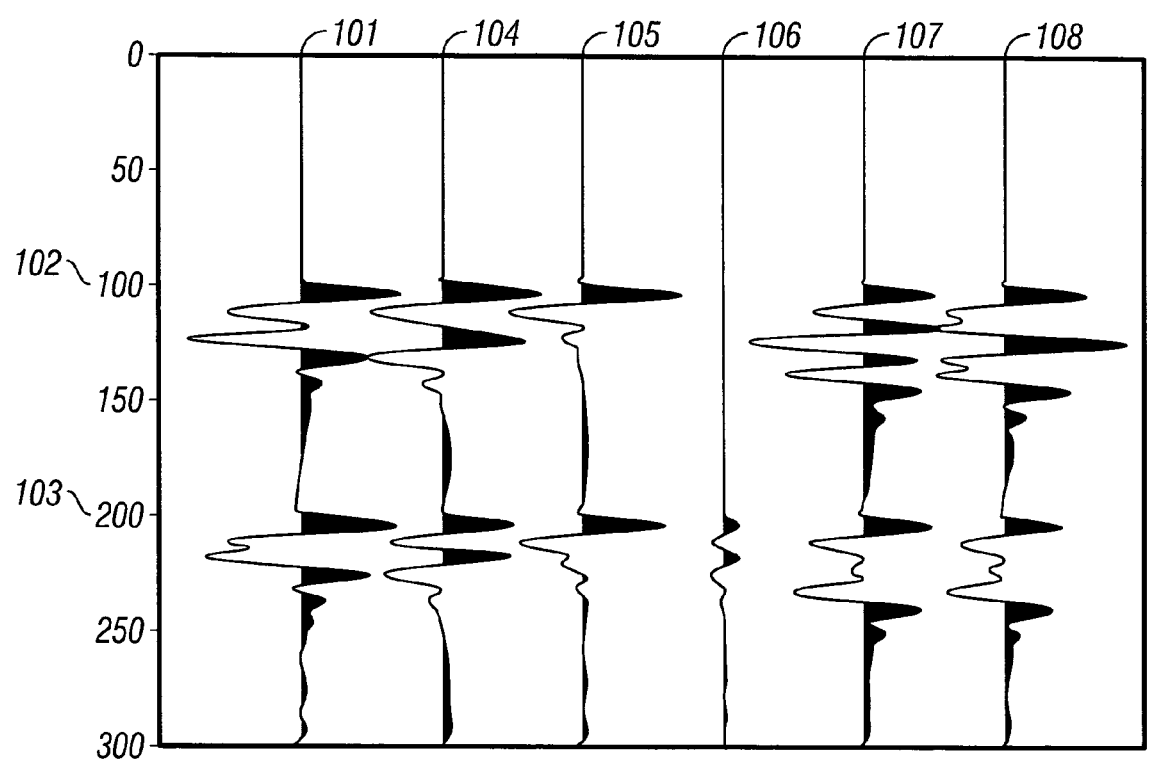
FIG. 10 is a section of pressure and vertical particle velocity synthetic traces with a second cross-ghosting time delay.

FIGS. 6-11 show graphs, sections, and views that illustrate the embodiments of the invention discussed with reference to the flowcharts in FIGS. 1-5. FIGS. 6-8 illustrate elements of the method of the invention with synthetic seismic traces. FIGS. 9-10 illustrate elements of cross-ghosting analysis with synthetic seismic traces.

FIG. 6 graphically displays the arrival angle $\phi(t)$ 61 in a vertical plane as a function of recording time t for the synthetic traces displayed in FIG. 7. The shot-to-receiver offset of the pressure and vertical particle velocity traces of FIG. 7 is 1500 meters, and the water depth is 500 meters. It can be seen that the vertical angles of incidence 61 range from about 57 degrees at 1.20 seconds 62 (the water bottom reflection) to about 5 degrees at 3.0 seconds 63.

FIG. 7 is a section of pressure and vertical particle velocity synthetic traces. The first trace 71 of FIG. 7 is the synthetic pressure sensor trace computed using a minimum phase air gun wavelet for each reflector, random reflection coefficients, ghosting time delays corresponding to the arrival angles of FIG. 6 and a streamer depth of 15 meters. The second trace 72 is the corresponding vertical particle velocity trace. Note that the amplitudes of this vertical particle velocity trace 72 are lower than those of the pressure trace 71 because of the large non-vertical arrival angles of the first reflections. Also note that there is no strong, low-frequency noise that would typically corrupt an actual particle velocity signal from a dual-sensor streamer. This noise is omitted to better evaluate the effectiveness of this method.

The third trace 73 represents an ideally corrected vertical particle velocity trace, ready for summing with the pressure trace to eliminate all surface ghost reflections. The fourth trace 74 is the result of computing the low-frequency portion of the particle velocity trace's spectrum from that of the first trace 71, assuming that all reflection wavelets arrive vertically, and merging it with the rest of the second trace's 72 spectrum. The computation was performed between 1 and 35 Hz, and the computed and actual spectra were merged between 25 and 35 Hz.

The fifth trace 75 is the error in the above result, that is, the third trace 73 minus the fourth trace 74. The early errors are very large and there are two sources of these errors. The first source of error is that no corrections in amplitudes were applied to the particle velocity trace for non-vertical arrival. The second source of error is that incorrect ghost reflection time delays were used when the low-frequency part of the particle velocity trace's spectrum was computed from the pressure signal spectrum, using equation (1), and replaced.

The sixth trace 76 is the resulting composite particle velocity trace of this method, as described above, and the seventh trace 77 is the error in that result (the third trace 73 minus the sixth trace 76). It can be seen that the error trace is very small, and that the disclosed method yields very accurate results. FIG. 8 is a section of the synthetic traces in FIG. 7, extended down to 3.0 seconds.

FIG. 9 is a section of pressure and vertical particle velocity synthetic traces with a first cross-ghosting time delay. As described in Vaage et al., discussed above, the particle velocity sensor signal is typically corrupted by streamer tow noise having frequencies of about 20 Hz and lower. In such a case, both the pressure and particle velocity signals are first minimum phase low-cut filtered, with the frequencies below 25 Hz being attenuated at a rate of 72 decibels per octave.

In FIG. 9, the first trace 91 is a low-cut filtered synthetic pressure sensor trace for a streamer towed at a depth of 15 meters. Two events are represented. The first event 92, at 100 milliseconds, represents a vertically arriving reflection wavelet, along with its ghost reflection wavelet which is delayed by 20 milliseconds two-way travel time to the sea surface and back, and which is opposite in polarity. The second event 93 on the the first trace 91, at 200 milliseconds, has an arrival angle of 45 degrees from vertical. The ghost time delay is reduced by a factor of cos(45°), but the amplitude is the same as that for the first, vertically arriving event 92. The pressure sensor has the same sensitivity for sound waves arriving from any direction.

The second trace 94 of FIG. 9 contains the corresponding events 92, 93, respectively as sensed by the vertical particle velocity sensor. There are two primary differences relative to the first trace 91. The first is that the ghost reflection for each reflection wavelet is the same polarity as the reflection wavelet. The second difference is that the amplitude of the reflection wavelet of the second event 93 and ghost reflection wavelet is reduced by a factor of cos(45°) due to the directivity of the vertical particle velocity sensor.

The third trace 95 in FIG. 9 is the sum of the first two traces 91, 94, divided by two. The ghost reflection has been completely eliminated from the first event 92 at 100 milliseconds. For the second event 93, the particle velocity signal is weaker than the pressure signal, so the resulting summed wavelet is too weak and the ghost reflection wavelet has not been completely eliminated. The fourth trace 96 shows the size of the error in the third trace 95.

Next, a cross-ghosting operation is performed on the first trace 91 and the second trace 94 to make their fundamental waveforms identical. Cross-ghosting is described in the next flowchart in FIG. 4 below.

FIG. 4 is a flowchart illustrating an embodiment of the invention for determining arrival angles from cross-ghosting analysis in FIG. 3. FIG. 4 illustrates in more detail the portion of the invention discussed in block 33 of FIG. 3, above.

At block 41, a second set of arrival angles $\{\phi_k\}$ is selected. The second set of arrival angles $\{\phi_k\}$ is selected to cover the range of arrival angles expected to be encountered in the seismic traces extracted from the recorded pressure signals h(t) and vertical particle velocity signals g(t) obtained in block 31 of FIG. 3. The second set of arrival angles $\{\phi_k\}$ may be designated as the set $\{\phi_k, \text{ for } k=0, 1, 2, \ldots, K\}$ for some selected total number of arrival angles equal to K+1. In one example embodiment with K=60, a set of 61 arrival angles $\phi_k$ are equal to the set $\{\phi_k\}=\{0°, 1°, 2°, \ldots, 60°\}$, corresponding to k=0, 1, 2, . . . , 60, respectively At block 42, an arrival angle $\phi_k$ is selected from the second set of arrival angles $\{\phi_k\}$ in block 41. Preferably, the arrival angles are selected in a systematic manner, such as proceeding sequentially through the arrival angles $\phi_k$ in the order k=0, 1, 2, . . . , K.

At block 43, a ghost reflection time delay $\tau_k$ is determined which corresponds to the arrival angle $\phi_k$ selected in block 42 from the second set of arrival angles $\{\phi_k\}$. Analogous to Equation (3) above, the ghost reflection time delay $\tau_k$ can be expressed by:

$$\tau_k = \cos(\phi_k)\frac{2D}{c}, \tag{5}$$

where D is receiver depth in meters and c is speed of sound in the medium in meters/sec. In water, c is typically about 1500 m/s.

At block 44, a time delay operator $Z_k$ is determined which corresponds to the ghost reflection time delay $\tau_k$ determined in block 43. Analogous to Equation (2) above, the time delay operator $Z_k$ can be expressed by:

$$Z_k = \exp[-i\omega\tau_k] = \cos(\omega\tau_k) - i\sin(\omega\tau_k). \tag{6}$$

At block 45, the pressure trace and the vertical particle velocity trace from block 31 of FIG. 3 are cross-ghosted at the ghost reflection time delay $\tau_k$ determined in block 43 by using the time delay operator $Z_k$ determined in block 44.

In the temporal frequency domain, the pressure trace and vertical particle velocity trace can be expressed as:

$$H_k(\omega) = \beta(1-Z_k) \tag{7}$$

and $$G_k(\omega) = \beta_\phi(1+Z_k) \tag{8}$$

respectively, where $\beta$ is the upward traveling wavefield and $\beta_\phi$ is the upward traveling wavefield modified by the particle velocity sensor's directional sensitivity.

The pressure and vertical particle velocity traces from Equations (7) and (8) can be made identical in form to one another, except for amplitude differences between $\beta$ and $\beta_\phi$, by cross-ghosting them. Cross-ghosting means applying the vertical particle velocity ghosting operator from Equation (8) to the pressure trace from Equation (7) and applying the pressure ghosting operator from Equation (7) to the vertical particle velocity trace from Equation (8): Thus, the cross-ghosting is performed by applying the following equations:.

$$P_k(1+Z_k) = \beta(1-Z_k)(1+Z_k) \tag{9}$$

and $$V_k(1-Z_k) = \beta_\phi(1+Z_k)(1-Z_k), \tag{10}$$

to yield the cross-ghosted pressure trace and the cross-ghosted vertical particle velocity trace, respectively.

At block 46, a zero-lag, normalized cross-correlation is calculated for the cross-ghosted pressure traces and the cross-ghosted vertical particle velocity traces from block 45. This zero-lag, normalized cross-correlation is described in further detail in the discussion with regard to the flowchart in FIG. 5.

At block 47, it is determined if any arrival angles $\phi_k$ remain from the second set of arrival angles $\{\phi_k\}$ selected in block 41. If any arrival angles $\phi_k$ remain, then the process returns to block 42 to select another arrival angle $\phi_k$. If no arrival angles $\phi_k$ remain, then the process continues on to block 48.

At block 48, it is determined which of the zero-lag, normalized cross-correlation values calculated in block 46 is the largest.

At block 49, the arrival angle $\phi_k$ corresponding to the largest value for zero-lag, normalized cross-correlations determined in block 48 is returned to block 33 of FIG. 3.

Returning to FIG. 9, the fifth trace 97 and the sixth trace 98 correspond to the first trace 91 and the second trace 94, respectively, after cross-ghosting using a ghost delay of 20 milliseconds, which is the correct ghost delay for the first, vertically arriving reflection 92. Note that, for the first event 92, the resulting two traces 97, 98 are identical. However, for the second event 93, the two traces 97, 98 appear quite different. This difference arises because the cross-ghosting delay is incorrect for the second event 93, i.e. 20 milliseconds instead of 20 milliseconds multiplied by cos(45°) which equals 14.14 milliseconds. The degree to which this cross-ghosting makes the two traces identical in form is very sensitive to errors in the ghost delay applied.

FIG. 10 is a section of pressure and vertical particle velocity synthetic traces with a second cross-ghosting time delay. In FIG. 10, the cross-ghosting delay has been changed to 14.14 milliseconds, and now the two resulting waveforms are very dissimilar for the first event 102, but have identical shapes for the second event 103. Note, however, that for the second event 103, the cross-ghosted particle velocity trace is weaker than the cross-ghosted pressure trace. It is weaker by the factor cos(45°).

In the method of the invention, the first trace 101 and the second trace 104 are cross-ghosted using ghost delays corresponding to non-vertical arrival angles ranging from zero to, for example, 60 degrees in one-degree steps by multiplying τ by the cosine of that range of angles. This results in 61 pairs of cross ghosted traces like the fifth trace 97, 107 and the sixth trace 98, 108 of FIGS. 9 and 10, respectively. For each of those 61 pairs of traces corresponding to the fifth trace 97, 107 and the sixth trace 98, 108, and for each time sample, the zero-lag, normalized cross-correlation value between those two traces is computed in, for example, an 80-millisecond time window. Calculation of the zero-lag, normalized cross-correlation is described in the flowchart in FIG. 5 below.

FIG. 5 is a flowchart illustrating an embodiment of the invention for determining a zero-lag, normalized cross-correlation of cross-ghosted traces in FIG. 4. FIG. 5 illustrates in more detail the portion of the invention discussed in block 46 of FIG. 4, above.

At block 51, a time window is determined for the time sample selected in block 32 of FIG. 3 in the pressure and vertical particle velocity traces selected in block 31 of FIG. 3. In one example embodiment, the time window is an 80-millisecond time window.

At block 52, a number N of pressure and vertical particle velocity time samples is determined in the time window determined in block 51 around the time sample from block 32 of FIG. 3.

At block 53, N time sample values $\{p_n, n=1, 2, \ldots, N\}$ are extracted from the pressure trace and N time sample values $\{v_n, n=1, 2, \ldots, N\}$ are extracted from the vertical particle velocity trace in the time window determined in block 51.

At block 54, two zero-lag auto-correlation factors $A_{pp}(0)$ and $A_{vv}(0)$ are calculated from the pressure and vertical particle velocity time sample values $\{p_n\}$ and $\{v_n\}$, extracted from the pressure and vertical particle velocity traces, respectively, from block 53. The two zero-lag auto-correlation factors $A_{pp}(0)$ and $A_{vv}(0)$ are used as normalizing factors in calculating the zero-lag, normalized cross-correlation below in block 56. The two zero-lag auto-correlation factors $A_{pp}(0)$ and $A_{vv}(0)$ are calculated by the following:

$$A_{pp}(0) = \sqrt{\frac{1}{N}\sum_{n=1}^{N}[p_n * p_n]} \quad (11)$$

and $$A_{vv}(0) = \sqrt{\frac{1}{N}\sum_{n=1}^{N}[v_n * v_n]}, \quad (12)$$

where * designates multiplication.

At block 55, a zero-lag cross-correlation factor $C_{pv}(0)$ is calculated from the time sample values $\{p_n\}$ and $\{v_n\}$ from block 53. The zero-lag cross-correlation factor $C_{pv}(0)$ is calculated by the following:

$$C_{pv}(0) = \sqrt{\left|\frac{1}{N}\sum_{n=1}^{N}[p_n * v_n]\right|}. \quad (13)$$

At block 56, a zero-lag, normalized cross-correlation $XCN_{pv}(0)$ is calculated from the two zero-lag autocorrelation factors $A_{pp}(0)$ and $A_{vv}(0)$ from block 54 and the cross-correlation factor $C_{pv}(0)$ from block 55. The zero-lag, normalized cross-correlation $XCN_{pv}(0)$ is calculated by the following:

$$XCN_{pv}(0) = \frac{C_{pv}(0)}{\sqrt{A_{pp}(0) \cdot A_{vv}(0)}}. \quad (14)$$

At block 57, the value for the zero-lag, normalized cross-correlation $XCN_{pv}(0)$ calculated in block 56 is returned to block 46 of FIG. 4.

The computed zero-lag normalized cross-correlation values range from a value of zero (indicating that the form of the two traces in the time window are completely dissimilar) to a value of one (indicating that the form of the two traces in the time window are identical except, possibly, for a scale factor).

The result is a set of K+1 cross-correlation values for each sample value of time, corresponding, for example, to arrival angles ranging from zero to 60 degrees in one-degree increments. The largest cross-correlation value for each sample value of time corresponds to that pair of cross-ghosted traces that is most similar in form because they were cross ghosted with the most correct ghost delay. And the angle corresponding to that largest cross-correlation value is the desired value of φ(t) for that sample value of time.

A stability issue concerning the determination of the arrival angle φ(t) can be addressed. Occasionally, there is some "jitter" during a trace's earliest event time zone, which affects which of the cross-ghosted trace pairs has the highest normalized zero-lag, cross-correlation value. The jitter is apparently caused by a rapid rate of change in vertical arrival angles in this time zone. High-cut filtering the sample values of φ(t) for each trace is helpful, prior to using them to apply the method of the invention. An example of an appropriate zero-phase high-cut filter would be a filter that applies 42 decibels per octave of attenuation to frequencies above 20 Hz.

In actual field data, the signal-to-noise ratio of the pressure and particle velocity traces diminishes with increasing time after the marine source is fired. As a result, the estimates of φ(t) from the cross-ghosting analysis become less stable with increasing recording time on each trace. As illustrated in FIG. 6, the arrival angles of reflection events tend to also diminish with increasing recording time on a trace. Thus, it is beneficial to restrict the estimated values of φ(t) using a curve such as that shown in FIG. 6, derived for each receiver station from a regional velocity function for reflections in the survey area. The following expressions for allowable upper and lower values of φ(t) works well:

$$\phi_{upper}(t) = \left\{1 + \alpha\left[\frac{\phi(t)}{100.0}\right]\right\}\phi(t) \quad (15)$$

and $$\phi_{lower}(t) = \left\{1 - \alpha\left[\frac{\phi(t)}{100.0}\right]\right\}\phi(t), \quad (16)$$

respectively, where α is typically set equal to 1.0. In a particular embodiment, the arrival angle φ(t) used in Equations (15)

and (16) can be calculated from knowledge of the regional velocity function and the source-to-receiver offset. This procedure is described, for instance, in co-pending U.S. patent application Ser. No. 12/221,255, "Method of Summing Dual-Sensor Streamer Signals Using Seismic Reflection Velocities", filed Aug. 1, 2008 by one of the co-inventors of the present invention and assigned to an affiliate company of the assignee of the present invention.

For a recording time such that the regional velocity function predicts an arrival angle $\phi(t)=60°$ degrees, $\phi_{upper}(t)=96°$, and $\phi_{lower}(t)=24°$. Since an arrival angle of 60° might occur for the earliest reflection events on a trace, the signal-to-noise ratio would be expected to be high, so very little restriction is applied to the arrival angle estimated using the cross-ghosting analysis. However, at a later trace time, when the signal-to-noise ratio is lower, the regional velocity function might indicate that $\phi(t)=20°$, $\phi_{upper}(t)=24°$, and $\phi_{lower}(t)=16°$. So the arrival angle estimated using the cross-ghosting analysis would then be much more restricted.

If it desired to lessen the restrictions applied to the arrival angles resulting from the cross-ghosting analysis, α can be made greater than 1.0. Making α less than 1.0 will increase the restrictions.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for geophysical prospecting comprising:
    disposing a dual-sensor seismic streamer in a body of water;
    responsive to signals recorded at sensors in the dual-sensor seismic streamer, calculating pressure and vertical particle velocity traces representing physical pressure and vertical particle velocity wavefields, respectively, traveling in the body of water incident on the sensors;
    correcting for low-frequency noise in vertical particle velocity sensors by transforming the seismic traces to produce combined pressure and vertical particle velocity traces representing pressure and vertical particle velocity wavefields, respectively, as they would appear if incident on the sensors with attenuated low-frequency noise, the transforming comprising:
        generating merged particle velocity traces by merging recorded vertical particle velocity traces, scaled in an upper frequency range using a time-dependent arrival angle as determined by cross-ghosting analysis, with simulated particle velocity traces, calculated in a lower frequency range from recorded pressure traces using a time-varying filter based on the time-dependent arrival angle;
        generating combined pressure and vertical particle velocity traces by combining the recorded pressure and merged particle velocity traces; and
    recording the combined pressure and vertical particle velocity traces.

2. The method of claim 1, wherein the vertical particle velocity signals are obtained by using accelerometers to record acceleration signals and determining vertical particle velocity traces from the recorded acceleration signals.

3. The method of claim 1, wherein the vertical particle velocity signals are obtained by using velocity sensors to record velocity signals and determining vertical particle velocity traces from the recorded velocity signals.

4. The method of claim 1, wherein the generating merged particle velocity traces comprises:
    recording pressure signals h(t) and vertical particle velocity signals g(t) at a receiver station in the towed streamer;
    temporally-transforming the recorded pressure signals h(t) and vertical particle velocity signals g(t) from a time domain to H(ω) and G(ω), respectively, in a frequency domain;
    selecting a first set of arrival angles $\{\phi_j\}$;
    performing the following for each of the first set of arrival angles $\{\phi_j\}$;
        selecting an arrival angle $\phi_j$ from the selected first set of arrival angles $\{\phi_j\}$;
        calculating particle velocity traces in a lower frequency range from the transformed pressure signal H(ω) for the selected arrival angle $\phi_j$ from the first set of arrival angles $\{\phi_j\}$, thereby generating simulated particle velocity traces $G_j^{calc}(\omega)$ in the lower frequency range;
        scaling the transformed vertical particle velocity traces G(ω) in an upper frequency range for the selected arrival angle $\phi_j$ from the first set of arrival angles $\{\phi_j\}$, thereby generating scaled particle velocity traces $G_j^{scal}(\omega)$ in the upper frequency range;
        merging the simulated particle velocity traces $G_j^{calc}(\omega)$ from the lower frequency range with the scaled particle velocity traces $G_j^{scal}(\omega)$ from the upper frequency range to generate merged particle velocity traces $G_j^{merg}(\omega)$, for the selected arrival angle $\phi_j$ from the first set of arrival angles $\{\phi_j\}$; and
        inverse-transforming the merged particle velocity traces $G_j^{merg}(\omega)$ from the frequency domain to $g_j^{merg}(t)$ in the time domain.

5. The method of claim 4, wherein the temporal transform is a temporal Fourier transform.

6. The method of claim 4, wherein the first set of arrival angles $\{\phi_j\}$ comprises the set of angles $\phi_j=0°, 1°, 2°, \ldots, 60°$ for $j=0, 1, 2, \ldots, 60$, respectively.

7. The method of claim 4, wherein the scaling the transformed vertical particle velocity traces comprises dividing the transformed vertical particle velocity sensor traces G(ω) in the upper frequency range by cosine of the selected arrival angle $\phi_j$ from the first set of arrival angles $\{\phi_j\}$, generating scaled particle velocity traces $G_j^{scal}(\omega)$.

8. The method of claim 4, wherein a combination of the lower frequency range and the upper frequency range have substantially the same bandwidth as the bandwidth of the recorded pressure sensor signal h(t).

9. The method of claim 4, wherein the calculating particle velocity traces $G_j^{calc}(\omega)$ in a low frequency range from a recorded pressure signal H(ω) for the selected arrival angle $\phi_j$ from the first set of arrival angles $\{\phi_j\}$ comprises applying the following equation:

$$G_j^{calc}(\omega) = \frac{1+Z_j}{1-Z_j} H(\omega),$$

where ω is radial frequency in radians/second, equal to $2\pi f$ for temporal frequency f, and $Z_j$ is a time delay operator.

10. The method of claim 9, wherein the time delay operator $Z_j$ is given by the equation:

$$Z_j = \exp[-i\omega\tau_j] = \cos(\omega\tau_j) - i\sin(\omega\tau_j),$$

where $\tau_j$ is ghost reflection time delay.

11. The method of claim 10, wherein the ghost reflection time delay τ is given by:

$$\tau_j = \cos(\phi_j)\frac{2D}{c},$$

where D is depth and c is speed of sound in water.

12. The method of claim 4, further comprising:
extracting a pressure trace and a particle velocity trace from the pressure signal h(t) and vertical particle velocity signal g(t), respectively;
extracting time samples at a recording time t from the pressure and particle velocity traces;
determining an arrival angle $\phi_k$ from a second set of arrival angles $\{\phi_k\}$ at the recording time t in the time samples from the pressure and particle velocity traces, by cross-ghosting analysis;
determining which arrival angle $\phi_j$ from the first set of arrival angles $\{\phi_j\}$ is closest to the determined arrival angle $\phi_k$ from the second set of arrival angles $\{\phi_k\}$; and
combining a time sample of the recorded pressure signal h(t) with a time sample of the corresponding merged particle velocity traces $g_j^{merg}(t)$ that corresponds to the closest arrival angle $\phi_j$ from the first set of arrival angles $\{\phi_j\}$.

13. The method of claim 12, wherein the determining an arrival angle by cross-ghosting analysis comprises
selecting a second set of arrival angles $\{\phi_k\}$;
performing the following for each of the second set of arrival angles $\{\phi_k\}$;
selecting an arrival angle $\phi_k$ from the selected second set of arrival angles $\{\phi_k\}$;
cross-ghosting the pressure and vertical particle velocity traces for the selected arrival angle $\phi_k$ from the second set of arrival angles $\{\phi_k\}$; and
calculating a zero-lag, normalized cross-correlation of the cross-ghosted pressure and vertical particle velocity traces, for the selected arrival angle $\phi_k$ from the second set of arrival angles $\{\phi_k\}$;
determining which value of the zero-lag, normalized cross-correlations is largest; and
determining the arrival angle $\phi_k$ from the second set of arrival angles $\{\phi_k\}$ that corresponds to the largest value determined for the zero-lag, normalized cross-correlations.

14. The method of claim 13, wherein the cross-ghosting comprises:
determining a ghost reflection time delay $\tau_k$ that corresponds to the selected arrival angle $\phi_k$ from the second set of arrival angles $\{\phi_k\}$;
determining a time delay operator $Z_k$ that corresponds to the determined ghost reflection time delay $\tau_k$; and
cross-ghosting pressure and vertical particle velocity traces using the time delay operator $Z_k$.

15. The method of claim 14, wherein the determining a ghost reflection time delay $\tau_k$ that corresponds to the selected arrival angle $\phi_k$ from the second set of arrival angles $\{\phi_k\}$ comprises applying the following equation:

$$\tau_j = \cos(\phi_j)\frac{2D}{c},$$

where D is sensor depth and c is speed of sound in water.

16. The method of claim 15, wherein determining a time delay operator $Z_j$ that corresponds to the determined ghost reflection time delay $\tau_k$ comprises applying the following equation:

$$Z_j = \exp[-i\omega\tau_j] = \cos(\omega\tau_j) - i\sin(\omega\tau_j),$$

where ω is radial frequency.

17. The method of claim 16, wherein cross-ghosting pressure and vertical particle velocity traces comprises applying the following equations:

$$P_k(1+Z_k) = \beta(1-Z_k)(1+Z_k)$$

and $$V_k(1-Z_k) = \beta_\phi(1+Z_k)(1-Z_k),$$

where β is the upward traveling wavefield and $\beta_\square$ is the upward traveling wavefield modified by the particle velocity sensor's directional sensitivity.

18. The method of claim 13, wherein the calculating a zero-lag, normalized cross-correlation $XCN_{pv}(0)$ of the cross-ghosted pressure and vertical particle velocity traces comprises:
determining time windows for the time samples in the pressure and vertical particle velocity traces;
extracting pressure and vertical particle velocity time sample values $\{p_n\}$ and $\{v_n\}$, respectively, in the time windows in the pressure and vertical particle velocity traces;
calculating two zero-lag auto-correlation factors $A_{pp}(0)$ and $A_{vv}(0)$ from the pressure and vertical particle velocity time sample values $\{p_n\}$ and $\{v_n\}$, respectively;
calculating a zero-lag cross-correlation factor $C_{pv}(0)$ from the pressure and vertical particle velocity time sample values $\{p_n\}$ and $\{v_n\}$, respectively; and
calculating a zero-lag, normalized cross-correlation $XCN_{pv}(0)$ from the two zero-lag auto-correlation factors $A_{pp}(0)$ and $A_{vv}(0)$ and the zero-lag cross-correlation factor $C_{pv}(0)$.

19. The method of claim 18, wherein the calculating two zero-lag auto-correlation factors $A_{pp}(0)$ and $A_{vv}(0)$ comprises applying the following equations:

$$A_{pp}(0) = \sqrt{\frac{1}{N}\sum_{n=1}^{N}[p_n * p_n]}$$

and $$A_{vv}(0) = \sqrt{\frac{1}{N}\sum_{n=1}^{N}[v_n * v_n]},$$

where N is the number of time sample values.

20. The method of claim 19, wherein the calculating a zero-lag cross-correlation factor $C_{pv}(0)$ comprises applying the following equation:

$$C_{pv}(0) = \sqrt{\left|\frac{1}{N}\sum_{n=1}^{N}[p_n * v_n]\right|}.$$

21. The method of claim 20, wherein the calculating a zero-lag, normalized cross-correlation $XCN_{pv}(0)$ comprises applying the following equation:

$$XCN_{pv}(0) = \frac{C_{pv}(0)}{\sqrt{A_{pp}(0) \cdot A_{vv}(0)}}.$$

* * * * *